United States Patent [19]

Colardelle

[11] Patent Number: 4,547,863
[45] Date of Patent: Oct. 15, 1985

[54] INTEGRATED CIRCUIT THREE-INPUT BINARY ADDER CELL WITH HIGH-SPEED SUM PROPAGATION

[75] Inventor: Joël S. G. Colardelle, Les Ulis, France

[73] Assignee: International Standard Electric Corporation, New York, N.Y.

[21] Appl. No.: 502,029

[22] Filed: Jun. 7, 1983

[30] Foreign Application Priority Data

Jun. 9, 1982 [FR] France .................. 82 10025

[51] Int. Cl.$^4$ .................................. G05F 7/50
[52] U.S. Cl. .................. 364/784; 307/471; 364/788
[58] Field of Search .................. 364/784–786, 364/787–788; 307/471, 472; 328/159

[56] References Cited

U.S. PATENT DOCUMENTS

| | | | |
|---|---|---|---|
| 3,590,230 | 6/1971 | Nordquist | 307/471 |
| 3,612,847 | 10/1971 | Jörgensen | 364/786 |
| 3,646,332 | 2/1972 | Suzuki | 364/784 |
| 4,399,517 | 8/1983 | Niehaus et al. | 364/784 |
| 4,485,316 | 11/1984 | Nuzillat et al. | 307/471 |

OTHER PUBLICATIONS

Boyle, "NOR Block Full Adder", *IBM Technical Disclosure Bulletin*, vol. 3, #4, p. 48, 1960.
De Man et al. "High-Speed NMOS Circuits for ROM-Accumulator and Multiplier Type Digital Filters, *IEEE Journal of Solid State Circuits*, vol. SC-13 #5, Oct. 1978, pp. 565-572.

*Primary Examiner*—Raulfe B. Zache
*Assistant Examiner*—Dale M. Shaw
*Attorney, Agent, or Firm*—Donald J. Lenkszus

[57] ABSTRACT

The binary adder cell is provided for summing three input binary variables A, B and C and has a sum output S and a carry output R. The cell comprises a first complemented exclusive-OR gate receiving the input variables A and B and providing an intermediate variable $F_1 = \overline{A \oplus B}$, a second complemented exclusive-OR gate receiving the intermediate variable $F_1$ and the input variable C and providing the sum output S, a third complemented exclusive-OR gate receiving the input variables A and C and providing an intermediate variable $F_3 = \overline{A \oplus C}$ and a carry generating circuit for generating the carry output R from the two intermediate variables $F_1$ and $F_3$ and the sum output S. The gates and the carry generating circuit are designed with MOS transistors according to the same general structure.

3 Claims, 2 Drawing Figures

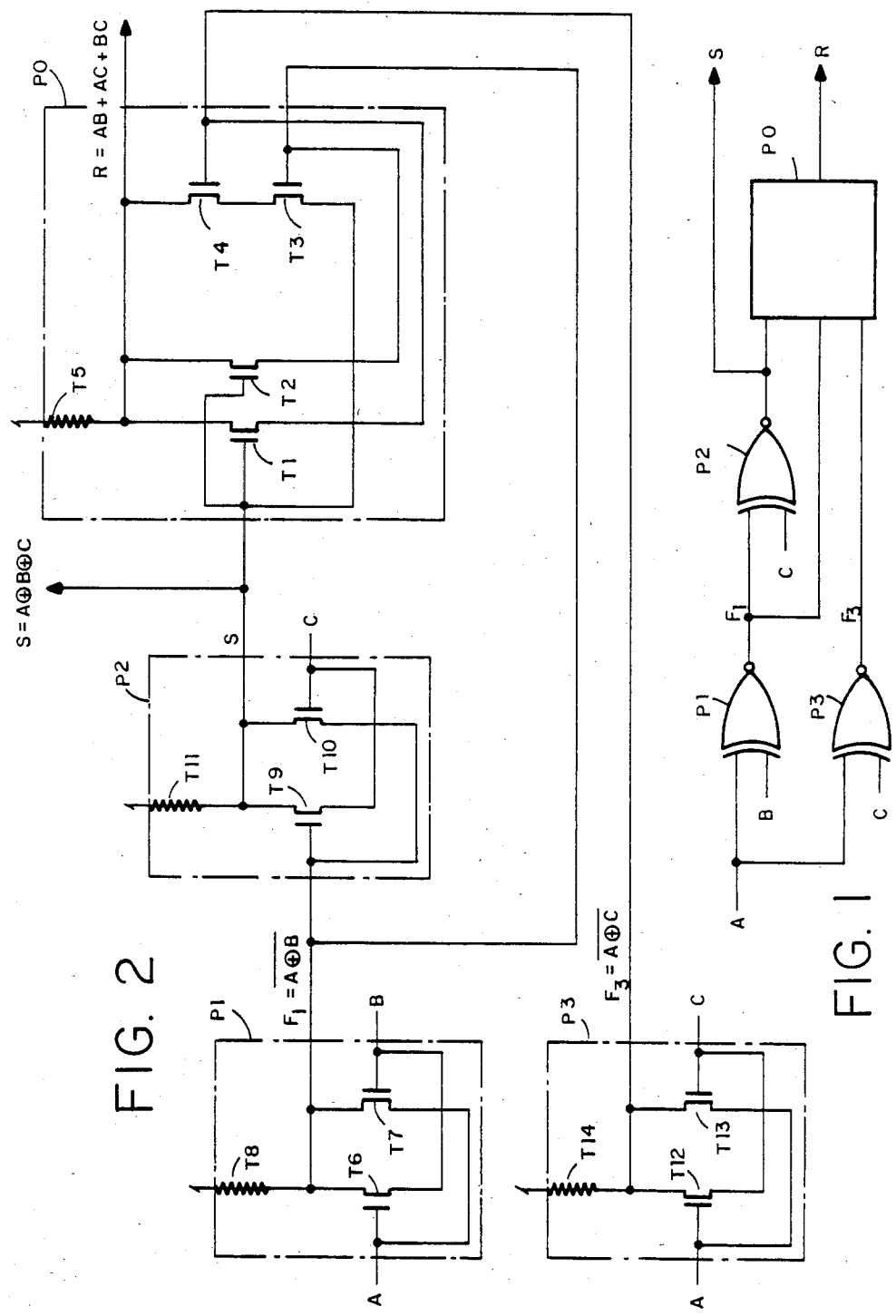

INTEGRATED CIRCUIT THREE-INPUT BINARY ADDER CELL WITH HIGH-SPEED SUM PROPAGATION

BACKGROUND OF THE INVENTION

This invention concerns a three-input binary adder cell with high-speed sum propagation, of integrated circuit design.

It is well known that high-speed carry adder cells are commonly used in the design of integrated multipliers or adders. However, adder cells with high-speed sum propagation, that is to say in which propagation of the sum is favoured with respect to that of the carry, can be especially interesting for example in integrated multipliers of the "pipe-line" type, or serial adding type. This type of multiplier, controlled by a clock and therefore synchronous, produces the partial products from the right to the left, that is to say from the bits of the lowest order toward the highest-order bits, exactly as in manual multiplication, the shift of a supplementary power of two occurring on each clock pulse. This type of multiplier is much slower than the so-called parallel integrated multipliers in which information is propagated asynchronously, but it reduces by a factor of about ten the silicon surface required to produce it with respect to the silicon surface required to produce a parallel miltiplier of the same capacity.

SUMMARY OF THE INVENTION

The object of this invention is therefore to furnish a three-input two-output binary adder cell with high-speed propagation of the sums $S = A \oplus B \oplus C$, of integrated circuit design, which can be used for example in an integrated serial multiplier.

According to the invention, this adder cell contains three two-input complemented exclusive-OR gates and a carry ($R = AB + AC + BC$) generating circuit. The first gate receives the first two input variables A and B and furnishes the first intermediate variable $F_1 = \overline{A \oplus B}$ to the second gate which receives, on the other hand, at its other input, the third input variable C. The output of this second gate furnishes the sum variable $S = A \oplus B \oplus C$. The third gate, receiving at its inputs the input variables A and C respectively, furnishes the second intermediate variable $F_3 = \overline{A \oplus C}$ to the carry generating circuit which receives, on the other hand, from the first gate its output $F_1 = \overline{A \oplus B}$ and from the second gate the sum output S. This carry generating circuit furnishes the carry variable R at its output.

BRIEF DESCRIPTION OF THE DRAWING

The invention will be better understood and other characteristics will be brought out in the following description and attached drawing in which:

FIG. 1 shows a block diagram used to explain the principle of the adder cell according to this invention; and FIG. 2 is a schematic diagram showing the detail of the elements of the cell shown in FIG. 1.

DESCRIPTION OF THE PREFERRED EMBODIMENT

FIG. 1 is a diagram showing the adder cell with three inputs A, B and C and two outputs S and R in accordance with this invention. This cell includes three two-input complemented exclusive-OR gates P1, P2 and P3, and a circuit P0 generating the carry R from the output signals furnished by the complemented exclusive-OR gates. The first gate P1 receives as its first input the first binary variable A and at its second input the second binary variable B. It furnishes the first intermediate binary variable $F_1 = \overline{A \oplus B}$ at its output. The second complemented exclusive-OR gate P2 receives at its first input this first intermediate variable $F_1$ and at its second input the third input binary variable C. At its output, it furnishes the binary sum variable S which constitutes the first output variable of the adder cell. The third complemented exclusive-OR gate P3 receives at its first input the first binary variable A and at its second input the third binary variable C. It furnishes at its output the second intermediate variable $F_3 = \overline{A \oplus C}$. The circuit P0 generating the carry R receives at its first input the output $S = A \oplus B \oplus C$ from the second complemented exclusive-OR gate P2, at its second input the output $F_1 = \overline{A \oplus B}$ from the first complemented exclusive-OR gate P1 and at its third input the output $F_3 = \overline{A \oplus C}$ from the third complemented exclusive-OR gate P3. It furnishes at its output the binary carry variable $R = AB + AC + BC$ which constitutes the second binary output variable of the adder cell.

FIG. 2 represents an adder cell, according to this invention, of MOS integrated circuit design. It contains fourteen elements, ten of which are transistors and four are resistors. The carry R generating circit P0 contains four transistors T1, T2, T3 and T4 and one resistor T5. In order to simplify the description, the drain and the source of each of the transistors will be designated under the common designation "terminals", the difference being easily resolved by anyone skilled in the art by means of the direction of the current caused by the source utilized. Only the gate will be designated as such. The first two transistors T1 and T2, the resistor T5 and the dipole, consisting of transistors T3 and T4 in series, have a common point which constitutes the output of this carry generating circuit. The second terminal of the resistor T5 is connected to the power supply. The second terminal of transistor T1 is connected to the gate of transistor T4. The second terminal of transistor T2 is connected to the gate of transistor T3. And the second terminal of the dipole, consisting of transistors T3 and T4, is connected to the gate of transistor T1, which is itself connected to the gate of transistor T2. This common point of transistors T1 and T2 constitutes the first input to the carry R generating circuit, receiving the sum variable S from the second gate P2. The second input to this circuit consists of the gate of transistor T3 which receives the variable $F_1 = \overline{A \oplus B}$ from the first gate P1. The third input to this circuit consists of the gate of transistor T4 which receives the variable $F_3 = \overline{A \oplus C}$ from the third gate P3. This carry generating circuit performs the logic function:

$$R = \overline{S}(\overline{F_1}F_3 + F_1\overline{F_3} + \overline{F_1}\overline{F_3}) + SF_1F_3.$$

This expression corresponds properly to the logical carry expression of the addition of three binary variables $R = \overline{S}(\overline{F_1} + F_1\overline{F_3}) + SF_1F_3$, which can be derived from the addition truth table given below, for the case in which we choose to write the expression of this carry as a function of the three variables S, $F_1 = \overline{A \oplus B}$ and $F_3 = \overline{A \oplus C}$.

| A | B | C | R | S | $F_1 = \overline{A \oplus B}$ | $F_3 = \overline{A \oplus C}$ |
|---|---|---|---|---|---|---|
| 0 | 0 | 0 | 0 | 0 | 1 | 1 |
| 0 | 0 | 1 | 0 | 1 | 1 | 0 |
| 0 | 1 | 0 | 0 | 1 | 0 | 1 |
| 0 | 1 | 1 | 1 | 0 | 0 | 0 |
| 1 | 0 | 0 | 0 | 1 | 0 | 0 |
| 1 | 0 | 1 | 1 | 0 | 0 | 1 |
| 1 | 1 | 0 | 1 | 0 | 1 | 0 |
| 1 | 1 | 1 | 1 | 1 | 1 | 1 |

The sum S and the intermediate variables $F_1$ and $F_3$ are generated by three identical MOS transistor networks, of well known type, used to constitute a complemented exclusive-OR gate by means of only two MOS transistors and a resistor.

The first gate P1 contains two transistors T6 and T7 and a resistor T8. These three components have a common terminal which constitutes the output of the gate furnishing the intermediate variable $F_1 = \overline{A \oplus B}$. The second terminal of the resistor T8 is connected to the power supply. The second terminal of the first transistor T6 is connected to the gate of the second transistor T7, both receiving the second input variable B. The second terminal of the second transistor T7 is connected to the gate of the first transistor T6, this terminal and this gate receiving the first input variable A.

The second gate P2 contains two transistors T9 and T10 and a resistor T11. These three components have a common terminal like the components T6, T7 and T8 of the first gate. This second gate P2 is identical with the first, transistor T9 replacing transistor T6, transistor T10 replacing transistor T7 and resistor T11 replacing resistor T8. The gate of the first transistor T9 receives the first input variable of this gate $F_1 = \overline{A \oplus B}$, and the gate of the second transistor T10 receives the second input variable of this gate which is the third input variable C of the adder cell.

The third gate P3 is identical with the first two gates P1 and P2 and contains as first transistor the transistor T12, as second transistor the transistor T13 and as resistor the resistor T14. The gate of the first transistor receives the first input variable A of the adder cell and the gate of the second transistor T13 receives its second input variable C which constitutes the third input variable of the cell.

Although this invention has been described in connection with a particular embodiment, it is clearly not limited to the said embodiment and is capable of modifications or variants still lying within its scope.

I claim:

1. A binary adder cell for summing three input binary variables A, B and C and having a sum output S and a carry output R comprising:

a first two-input complemented exclusive-OR gate having a first input coupled to said input variable A, a second input coupled to said input variable B and an output for providing a first intermediate variable $F_1 = \overline{A \oplus B}$;

a second two-input complemented exclusive-OR gate having a first input connected to said output of said first gate, a second input coupled to said input variable C and an output for providing said sum output $S = A \oplus B \oplus C$;

a third two-input complemented exclusive-OR gate having a first input coupled to said input variable A, a second input coupled to said input variable C and an output for providing a second intermediate variable $F_3 = \overline{A \oplus C}$; and a carry generating circuit having first, second and third inputs respectively connected to the outputs of said second gate, of said first gate and of said third gate and an output for providing said carry output $R = \overline{S}(F_1 + F_1\overline{F_3}) + SF_1F_3$.

2. A binary adder according to claim 1, wherein said carry generating circuit includes:

a resistor having one terminal connected to one terminal of a power supply and an other terminal providing said carry output R;

first and second MOS transistors having first terminals connected to said other terminal of said resistor, their gates connected to said first input of said carry generating circuit and second terminals respectively connected to said third and second inputs of said carry generating circuit; and third and fourth MOS transistors having each a first and a second terminal and a gate, the first terminal of said third transistor being connected to the second terminal of said fourth transistor, the first terminal of said fourth transistor being connected to said other terminal of said resistor, the second terminal of said third transistor being connected to said first input of said carry generating circuit and the gates of said third and fourth transistors being respectively connected to said second and third inputs of said carry generating circuit.

3. A binary adder cell according to claim 2, wherein said first, second and third two-input comlemented exclusive-OR gates include each:

a resistor having one terminal connected to said one terminal of said power supply and an other terminal connected to the output of said comlemented exclusive-OR gate; and first and second MOS transistors having first terminals connected to the output of said complemented exclusive-OR gate, second terminals respectively connected to said second and first inputs of said complemented exclusive-OR gate and gates respectively connected to said first and second inputs of said complemented exclusive-OR gate.

\* \* \* \* \*